Jan. 8, 1929.  1,698,670

A. J. BUQUET

CANE HARVESTER

Filed Aug. 12, 1924   5 Sheets-Sheet 1

Inventor
A. J. Buquet
by Wilkinson & Giusta
Attorneys.

Jan. 8, 1929.

A. J. BUQUET 1,698,670

CANE HARVESTER

Filed Aug. 12, 1924

Inventor

A.J. Buquet by Wilkinson & Giusta

Attorneys

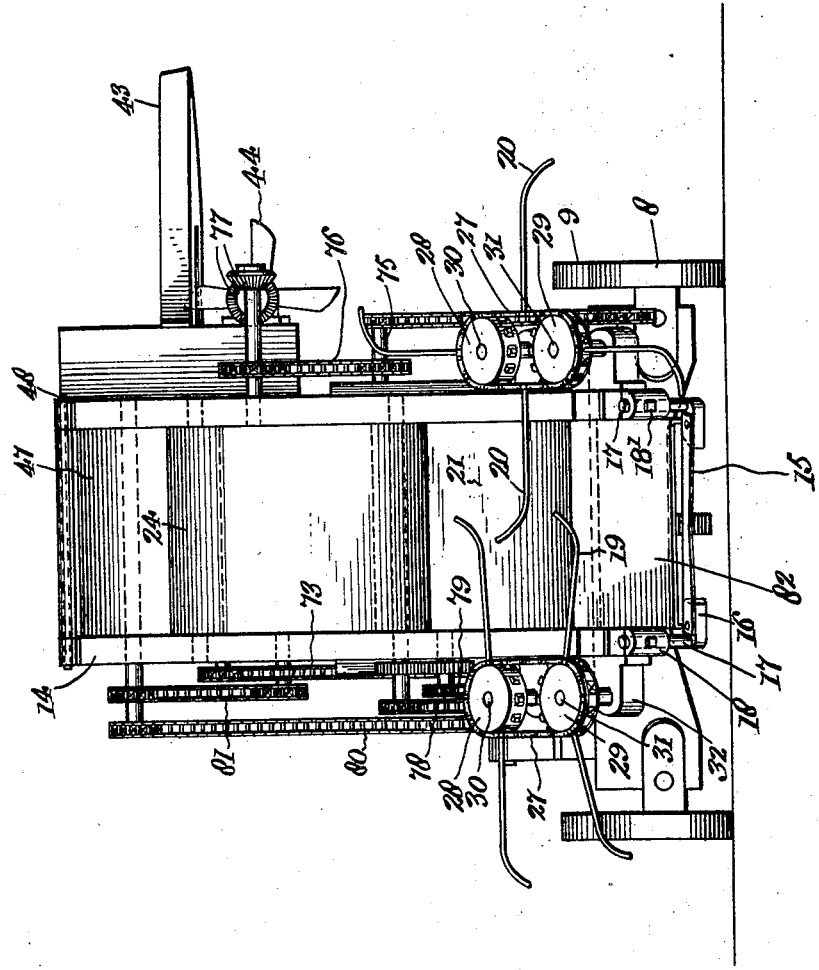

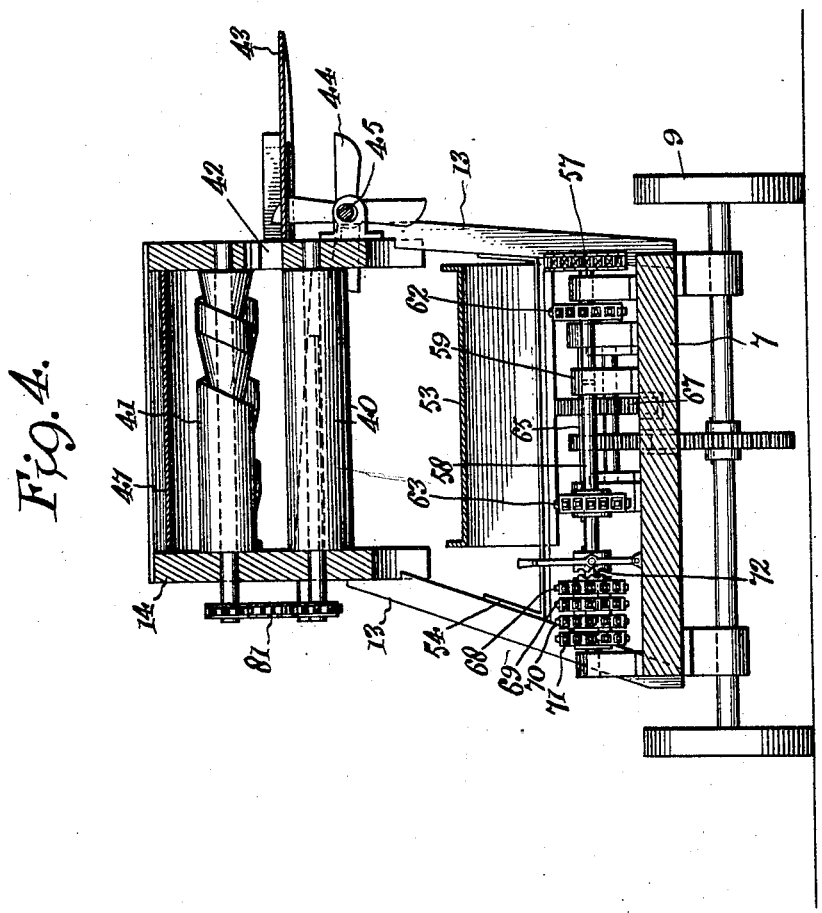

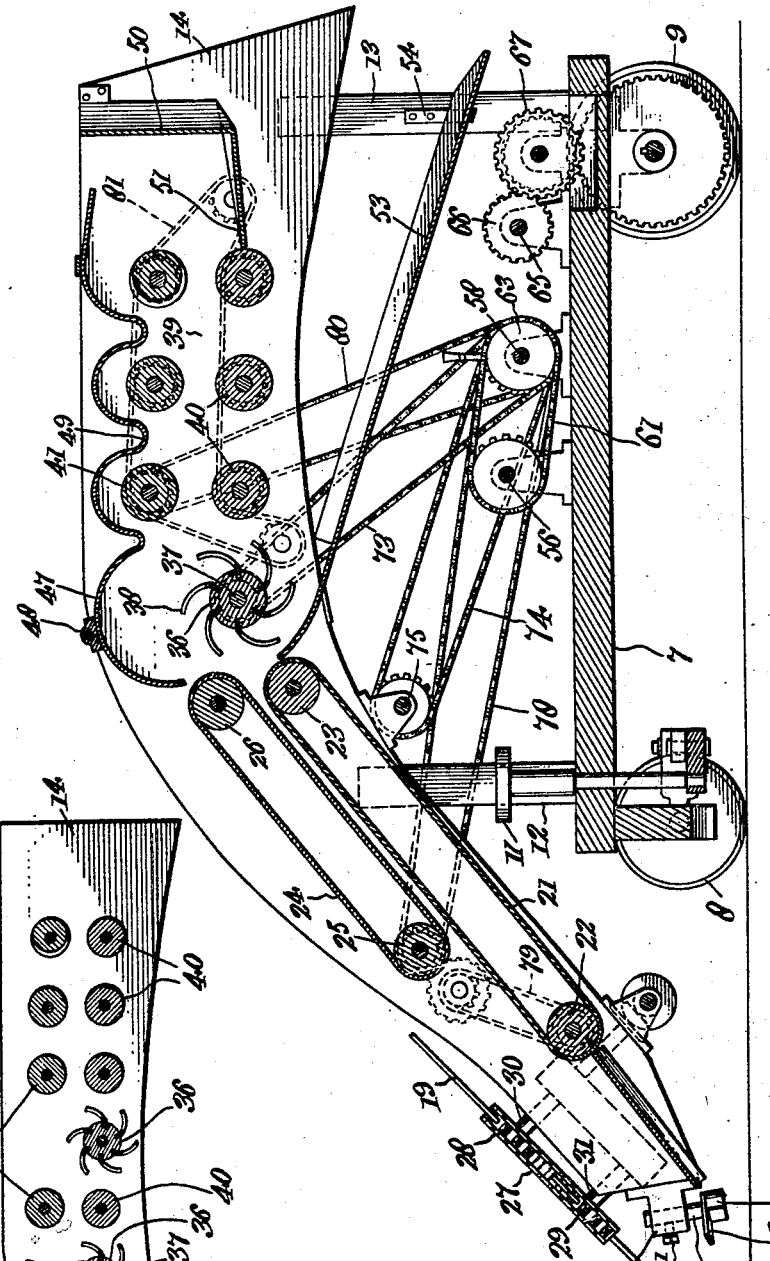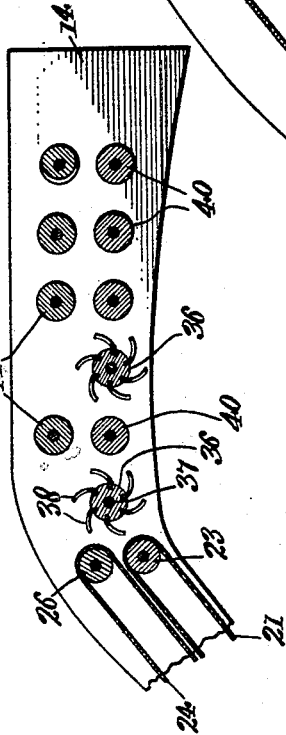

Patented Jan. 8, 1929.

1,698,670

UNITED STATES PATENT OFFICE.

ALBERT JOSEPH BUQUET, OF KAHNS, LOUISIANA.

CANE HARVESTER.

Application filed August 12, 1924. Serial No. 731,620.

The present invention relates to improvements in cane harvesters, and aims to provide a machine for cutting the cane stalks during progress of the machine through the field, moving these cane stalks on to a conveyor by which they are transferred to a stripper for removing the shucks, after which the stalks are delivered to a topper and a separator for delivering the heads and stalks at separate points.

An object of the invention is to provide a coordinated machine of compact and simple mechanical construction for effecting these various purposes in a quick and efficient manner at an expenditure of small power and at correspondingly small cost.

With the foregoing and other objects in view, the invention will be more fully described hereinafter, and will be more particularly pointed out in the claims appended hereto.

Figure 2 is a top plan view with parts broken away.

Figure 3 is a front view.

Figure 4 is a vertical section taken on the line 4—4 in Figure 1.

Figure 5 is a vertical section taken longitudinally or at right angles to Figure 4; and Figure 6 shows a modification.

Figure 1:
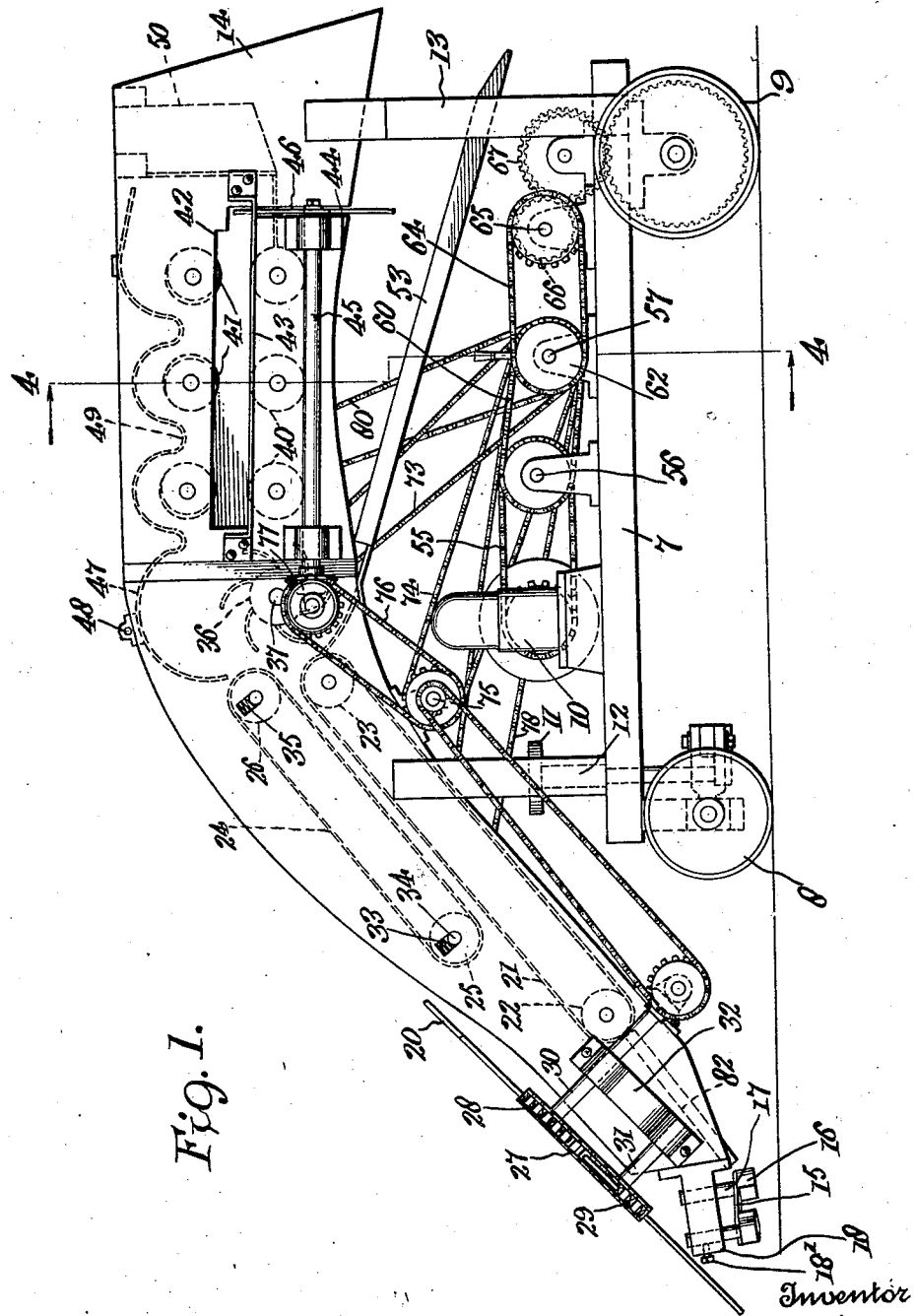
Figure 1 is a side view of an apparatus constructed according to the present invention.

Referring more particularly to the drawings, 7 designates a platform or carriage mounted upon the front or steering wheels 8 and the rear drive wheels 9. The platform carries a gasoline or other motor 10 by which the rear wheels 9 are driven through appropriate gearing and by which also the various instrumentalities are kept in operation.

The steering control wheel is represented at 11, and the platform carries front and rear standards 12 and 13 which support the side stiles 14. These side stiles are two in number, and are affixed approximately to the upper portion of the standards or posts above the platform and extend down and forwardly in front of the machine to a point near the ground line. The front side stiles or the forward extensions thereof, carry an inclined knife blade 15, which is preferably arranged at an angle so as to effect a shearing cut of the stalks near the base thereof. The knife is carried by the feet 16 projecting toward one another and disposed upon the pins 17 which fit in openings made in the lugs 18, which extend forwardly from the lower portions of the stiles. Set screws 18' are adapted to hold the pins in place and to permit of the removal of the knife blade for the purpose of sharpening or renewing the same. The stalks being severed by the knife, are swept upwardly by the pairs of fingers 19 and 20, which are curved at their outer ends so as to catch the stalks and force the same upon the conveyor 21, which is disposed between the inclined or diagonal front portions of the stiles, this conveyor being an endless band as shown in Figure 5, and extending upon the rollers 22 and 23, which are journalled in the side stiles and driven from the motor 10 as hereinafter explained.

The second conveyor 24 is shorter than the conveyor 21, and off-set upwardly and backwardly therefrom so as to leave an opening space at the front portion of the lower conveyor to receive the stalks from the arms 19 and 20. This auxiliary conveyor 24 extends about the rollers 25 and 26, also journalled between the side stiles and the adjacent runs of the conveyor belts are spaced slightly apart so as to admit the stalks therebetween, but at the same time to exert a frictional pressure upon the stalks in the act of lifting the stalks to the stripper mechanism. The conveyors are driven in relatively opposite directions so that the adjacent runs move in the same direction upwardly to effect a lifting of the stalks.

The arms 19 and 20 extend outwardly from the chains 27, trained about the pair of sprockets 28 and 29 mounted at opposite sides of the stiles upon the shafts 30 and 31, these shafts being journalled in the ears 32 carried at an inclination by the intermediate portions of the stile bars. These sprocket chains are also driven from the motor 10 as hereinafter explained.

As shown in Figures 1, slots 33 are made in the stile bars to slidably receive the trunnions 34 of the auxiliary conveyor, and springs 35 are arranged in the slots to exert a downward pressure upon the trunnions in order to add to the frictional pressure exerted upon the cane stalks.

The cane is delivered by the two conveyors at the upper portion of the diagonal front extensions of the stiles to a stripper by which the leaves, shucks and any foreign matter is removed from the stalk. This stripper may be of any appropriate character, and in the instance shown, it consists of a drum 36 affixed to a shaft 37 driven from the machine motor and having the curved fingers 38, which are sharpened as indicated in Figure 2, in order to effectually strip the stalks. From the stripper, the stripped stalks are delivered to the topping and separating compartment 39, in which are placed a number of lower rolls 40, here shown to be three in number, constituting supporting rolls. Above these rolls 40 are conveyor rolls 41 having worms as shown in Figure 2. The first two rolls are preferably provided with half worms, while the last roll in the series is provided with a worm extending entirely over the surface. The tendency of the stalks will, of course, be to come up lengthwise and the worm rolls shift these stalks laterally and separate or spread them apart from one another toward the exit opening 42, beyond which is placed the apron 43 for catching the stalks. Adjacent the opening is a topping knife 44, consisting of rotary blades mounted upon a shaft 45 and extending into the topping compartment through the slot 43 made in the adjacent stile bar. It is understood that the apron is affixed to the stile bar just below the opening to catch the topped stalks. The various rolls and the knife 44 are all driven by appropriate gearing from the motor 10.

The top of the compartment 39 is closed by a cover 47 pivoted at 48, the cover being preferably of sheet metal and having depressed portions 49 or corrugations to fit between the upper rolls 41 in order to avoid the entangling of the rolls by the stalks, leaves or any foreign matter, and the cover may be simply lifted to give access to the interior of the roll for the purpose of cleaning and making adjustments. The rear end of the compartment 39 is closed by a wall 50 of sheet metal or other appropriate material, having a flange 51 extending from its lower end forwardly, and the flange is cut away at one corner as indicated at 52 in Figure 2 to admit the passage of the blades of the topping knife 44, and this cut away portion also permits the removed tops of the stalks to fall down with the other refuse including the stripped material upon the inclined chute 53, which extends from a high point beneath the stripper downwardly and rearwardly beneath the various rolls, the rear end portion being held as by the brackets 54 to the rear supporting posts 15.

The motor 10 through the chain 55 drives the main shaft 56. The main shaft 56 drives the two counter shafts 57 and 58 shown in Figure 4, these shafts being in axial alinement, but being unconnected and shown spaced apart in the bearing 59. The shaft 57 is shown to be driven by the chain 60, appearing in Figure 4, while the other counter shaft 58 is driven from the main shaft by the chain 61 shown in Figure 5. The chain 60 engages about a sprocket wheel 62 shown in Figure 4, while the chain 61 engages and drives the sprocket 63 on the other counter shaft 58, this being also shown in Figure 4. The counter shaft 57 is intended to drive the rear wheels and the train of connections is as follows:

The chain 64 from the counter shaft 57 to the drive shaft 65 acts to drive the latter, this drive shaft 65 is shown in Figure 5 as having the pinion 66 to drive the differential mechanism 67 upon the rear end. This mechanism may provide for driving the machine in high and low gear and in forward or reverse directions.

The other counter shaft 58 is provided with four sprockets 68, 69, 70 and 71, and with a clutch mechanism 72 for engaging and disengaging these sprockets. The first sprocket 68 is coupled by the chain 73 to drive the stripper 36; the second sprocket 69 drives the topping knife shaft 44 through the chain 74, shaft 75 (Fig. 5), chain 76, and beveled gear wheels 77 (Fig. 3). The third sprocket 70 drives both conveyors 21 and 24 through the chains 78 and 79, both shown in Fig. 5. The fourth sprocket 71, through the chain 80, drives one of the upper rolls in the chamber 39 and the chain 81, passing about various sprockets on these roll shafts, drives all of the rolls in a proper direction.

In the use of the device, the machine is driven through the field with the cutting blade 15 in advance, by which the cane stalks are severed near their lower ends. Due to the forward movement of the machine, the severed stalks will naturally tend to fall over upon the plate or apron 82 extending between the most forward portions of the stiles, and in this movement the cane is assisted by the curved arms 19 and 20 which sweep the cane up and upon the lower conveyor. Here it is carried between the two conveyors 21 and 24 and lifted to the stripper where the pointed and inclined blades cut the leaves and other foreign material, the stalks passing up over the stripper and between the rolls 40 and 41, the stalks being lengthwise and having a tendency to move toward the exit opening 42 by reason of the rollers upon the upper shafts. This also has a tendency to keep the stalks in a longitudinal direction and to hold the tops in position for cutting by the topping knife 44, which rotates continuously. The cut tops fall through the opening in the flange in the back wall upon the apron or chute 53, and are delivered with the refuse at the rear of the machine to be collected later or a trailer might be provided to catch this refuse. The stripped and topped stalks pass out upon the apron 43 and a suitable receptacle may be provided to catch these stalks.

It will be appreciated that from the foregoing the apparatus is adapted to perform not only a harvesting operation, but also simultaneously to strip and top the stalks and to place the same in readiness for the mill without undergoing any further operations at an intermediate station between the harvester and the mill. The various agencies for performing these functions are grouped together closely and cooperate to effect the results noted.

It is obvious that various changes and modifications may be made in the details of construction and design of the above specifically described embodiment of this invention without departing from the spirit thereof, such changes and modifications being restricted only by the scope of the following claims.

What is claimed is:

1. A cane harvester comprising a wheeled frame, spaced side stiles including substantially horizontal portions and diagonal portions extending from the forward ends of the horizontal portions downwardly to a point in front of the vehicle and close to the ground, means on the vehicle for supporting the stile bars at an elevation above said vehicle, cutting means for the stalks extending across the forward portions of the stile bars, gathering means also carried by the lower portions of the stile bars for acting on the stalks above the cutting means and moving said stalks down to a position lengthwise of the vehicle and with the tops of the stalks extending rearwardly of the vehicle, upper and lower endless conveyors carried between the diagonal portions of the stile bars with the lower conveyor extending forwardly of the upper conveyor and the upper conveyor extending rearwardly of the lower conveyor, rotary stripping means located between the stile bars adjacent the space between the upper ends of the conveyors, said rotary conveyor having its upper stripping portion moving forwardly, a number of spirally grooved rolls mounted with their axes transversely disposed in the horizontal portions of the stile bars rearwardly of said stripping means, means for driving said rolls, a table supported by one of the stile bars adjacent said rolls for receiving the transversely moving stalks therefrom, and topping means at the rear portion of the table.

2. A cane harvester comprising a wheeled vehicle, supports thereon, a pair of spaced side stile bars carried above said vehicle by said standards, said stile bars having substantially horizontal rear portions and downwardly inclining front portions, stalk cutting means carried by the forward portions of the stile bars, gathering means also carried by the forward portions of the stile bars and acting to move the stalks rearwardly and to force the same down with their tops extending rearwardly, upper and lower endless conveyors carried by the diagonal portions of said stile bars with the forward portion of the lower conveyor extending forwardly beyond the upper conveyor and with the rear portion of the upper conveyor extending backwardly beyond the lower conveyor, rotary stripping means mounted between said stile bars adjacent the rear portions of the conveyors for receiving the stalks therefrom at the upper portion of the stripping means, said rotary stripping means having its upper stripping portion moving forwardly, upper and lower sets of spiral rolls mounted in the stile bars rearwardly of the stripping means with their axes disposed transversely for receiving the stalks and moving the same sidewise, one of said stile bars having a slot therein opposite the space between the rolls, a table carried by the slotted stile bar on the outside thereof for receiving the laterally moving stalks, and topping means extending up beyond the rear portion of the table.

ALBERT JOSEPH BUQUET.